(12) United States Patent
Blumer et al.

(10) Patent No.: US 8,497,423 B2
(45) Date of Patent: Jul. 30, 2013

(54) HIGH VOLTAGE DC TETHER

(75) Inventors: Eric Blumer, Scottsdale, AZ (US);
Cristian Anghel, Oro Valley, AZ (US)

(73) Assignee: Honeywell International, Inc, Morristown, NJ (US)

( * ) Notice: Subject to any disclaimer, the term of this patent is extended or adjusted under 35 U.S.C. 154(b) by 328 days.

(21) Appl. No.: 12/967,862

(22) Filed: Dec. 14, 2010

(65) Prior Publication Data

US 2012/0043108 A1   Feb. 23, 2012

Related U.S. Application Data

(60) Provisional application No. 61/375,697, filed on Aug. 20, 2010.

(51) Int. Cl.
*H01B 7/00*     (2006.01)
(52) U.S. Cl.
USPC ............................................................ 174/36
(58) Field of Classification Search
USPC ................................ 174/28, 29, 102 R, 102 SC
See application file for complete search history.

(56) References Cited

U.S. PATENT DOCUMENTS

| | | | | |
|---|---|---|---|---|
| 4,333,706 | A | * | 6/1982 | Davis et al. .................... 385/100 |
| 5,750,931 | A | * | 5/1998 | McGregor et al. ...... 174/110 PM |
| 5,834,699 | A | * | 11/1998 | Buck et al. ................. 174/113 R |
| 5,846,355 | A | * | 12/1998 | Spencer et al. .................. 156/53 |
| 6,325,330 | B1 | | 12/2001 | Lavan |
| 6,566,604 | B2 | * | 5/2003 | Booth et al. ............... 174/110 R |
| 2002/0109045 | A1 | | 8/2002 | Beach et al. |
| 2008/0048453 | A1 | | 2/2008 | Amick |
| 2008/0296040 | A1 | * | 12/2008 | Hui ............................ 174/101.5 |
| 2012/0141809 | A1 | * | 6/2012 | Kanmuri ........................ 428/457 |

FOREIGN PATENT DOCUMENTS

JP     2005-137153 A   *   5/2005

* cited by examiner

*Primary Examiner* — William H Mayo, III
(74) *Attorney, Agent, or Firm* — Shimokaji & Assoc., PC

(57) ABSTRACT

A high voltage direct current (DC) tether for an airborne wind turbine includes one conductor in the center of the feeder and the shielding of the feeder as a second conductor. A mechanical strength element is disposed in between the center conductor and the shielding. In this configuration, the mechanical strength element acts also as an insulator. The center conductor and the shielding can be made of aluminum or copper. The strength element can be a high strength fiber composite, woven such as VECTRAN® or SPECTRA®. The shielding is typically used as the return conductor.

16 Claims, 2 Drawing Sheets

HIGH VOLTAGE DC TETHER

CROSS-REFERENCE TO RELATED APPLICATIONS

This application claims priority to U.S. provisional application No. 61/375,697 filed Aug. 20, 2010, which is herein incorporated by reference.

BACKGROUND OF THE INVENTION

An airborne wind turbine is a design concept for a wind turbine that is supported in the air without a tower. Airborne wind turbines may operate in low or high altitudes. Since the generator is aloft, a conductive tether is used to transmit energy to the ground and to provide the required mechanical strength. Airborne turbine systems have the advantage of tapping an almost constant wind, without requirements for slip rings or yaw mechanisms, and without the expense of tower construction.

These flying electric generators are proposed to harness kinetic energy in the powerful, persistent high altitude winds. As shown in "Harnessing High Altitude Wind Power" by Bryan W. Roberts, et al., the average power density can be as high as 20 kW/m$^2$ in an approximately 1000 km wide band around latitude 30° in both Earth hemispheres. Starting at 3000 feet altitude and above, tethered rotorcraft could give individual rated outputs from hundred of kilowatts up to several megawatts (MW). These aircraft are highly controllable and can be flown in arrays, making them a source of reliable wind power. Roberts shows an electromechanical tether designed to transmit 240kW at a voltage of 15 kV. The electrical transmission efficiency is 90%. The tether has two insulated aluminum conductors embedded in a Vectran fiber composite. The tether's specific weight is around 115 kg/km and has a diameter of 10 mm. The craft is designed for operations up to 15,000 feet (4600 m) and the total tether weight is over 500 kg. The weight of this tether is large compared with the air vehicle creating a suboptimum system.

As can be seen, there is a need for a tether for an airborne wind turbine that may conduct the generated electricity to the Earth, while providing shielding and lightning protection and strength.

SUMMARY OF THE INVENTION

In one aspect of the present invention, a cable comprises a first conductor; an insulation layer surrounding the first conductor; and a second conductor disposed about the insulation layer, wherein the insulation layer includes a high strength fiber composite material adapted to provide mechanical strength to the cable; and the second conductor provides electromagnetic shielding and lightning protection to the cable.

In another aspect of the present invention, a high voltage direct current (HVDC) tether for tethering an airborne wind turbine to the Earth comprises a first conductor; an insulation layer coaxially disposed about the first conductor; and a second conductor coaxially disposed about the insulation layer, wherein the insulation layer includes a high strength fiber composite material adapted to provide mechanical strength to the cable; and the second conductor provides electromagnetic shielding and lightning protection to the cable.

In a further aspect of the present invention, a cable for supporting and electrically connecting an airborne wind turbine to Earth comprises a first conductor; an insulation layer coaxially disposed about the first conductor; a conductor screen coaxially disposed between the first conductor and the insulation layer; a second conductor coaxially disposed about the insulation layer; and a moisture impermeable protective screen covering the second conductor, wherein the insulation layer includes a high strength fiber composite material adapted to provide mechanical strength to the cable; and the second conductor provides electromagnetic shielding and lightning protection for the cable.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a high voltage direct current (DC) tether for an airborne wind turbine that has a reduced weight compared to conventional tethers. The weight reduction is achieved by using one conductor in the center of the feeder and the shielding of the feeder as a second conductor. A mechanical strength element is disposed in between the center conductor and the shielding. In this configuration, the mechanical strength element acts also as an insulator. The center conductor and the shielding can be made of aluminum or copper. The strength element can be a high strength fiber composite, woven such as VECTRAN® or SPECTRA®. The main weight saving is due to using the shielding for multiple purposes—as a conductor, as lightning protection and as an electromagnetic interference (EMI) effects barrier, while providing strength to the tether. The shielding is typically used as the return conductor.

Figure 1:
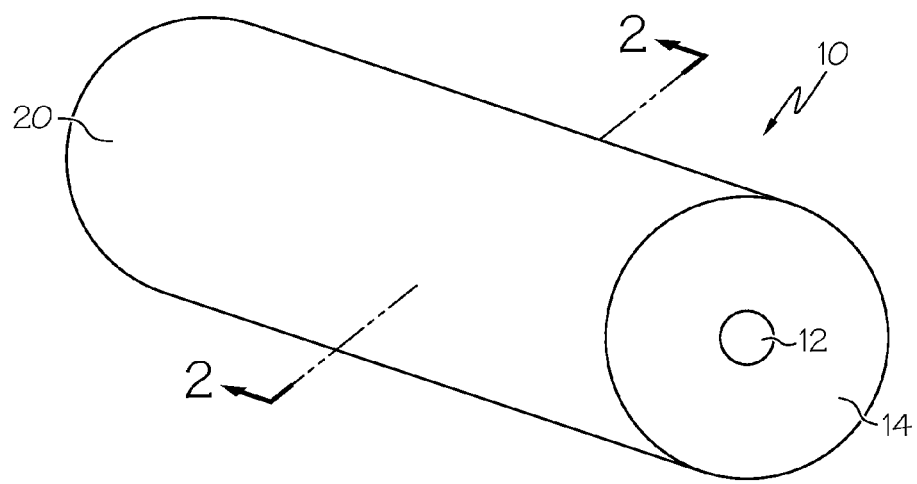
FIG. 1 is perspective view of a high voltage DC (HVDC) tether according to an exemplary embodiment of the present invention.
Figure 2:
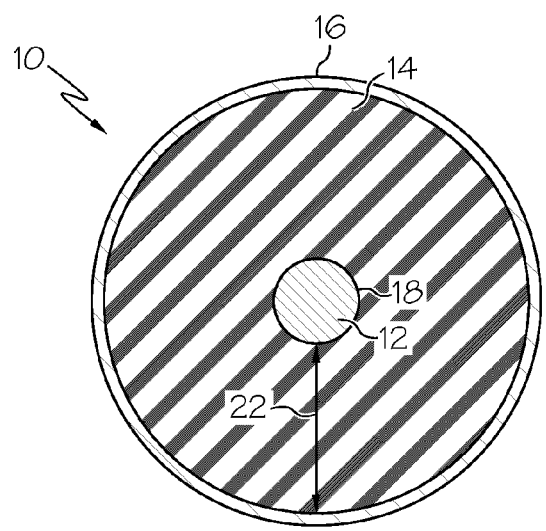
FIG. 2 is cross-sectional view taken along line 2-2 of FIG. 1.

Referring to FIGS. 1 and 2, a high voltage direct current (HVDC) tether 10 may include a first conductor 12 surrounded by a insulation layer 14. A second conductor 16 may be disposed on the outside of the insulation layer 14. In some embodiments, the first conductor 12 may be coaxially arranged relative to the second conductor 16. A conductor screen 18 may be disposed between the first conductor 12 and the insulation layer 14. A protective screen 20 may be disposed over the outer surface of the second conductor 16.

The first conductor 12 may be made of any suitable conductive material, such as copper, aluminum, nanotubes, or the like. The conductor screen 18 may be an extruded insulating conductor screen. In some embodiments, the conductor screen 18 may be made of polyethylene. In some embodiments, for a tether transmitting 1 MW at 15 kV, and using Spectra fiber with a steady state tensile strength of 50,000 lbs., the first conductor 12 may be a number 6 American wire gauge (AWG) aluminum wire having a thickness of about 0.16 inch. The conductor screen 18 may be about 0.020 inch thick.

The insulation layer 14 may be made of a high strength insulating material. In some embodiments, the insulation layer 14 may include a high strength fiber rope. The insulation layer 14 may be made of polyester, such as VECTRAN®. In some embodiments, the insulation layer 14 may be made of an ultra-high molecular weight polyethylene, such as SPECTRA®. The insulation layer 14 may act as a mechanical strength element, providing mechanical strength to the HVDC tether 10. In some embodiments, the insulation layer 14 may be made of Spectra 12® and may have a thickness of about 0.39 inch thick.

The second conductor 16 may be made of any suitable conductive material, for example, copper, aluminum, nanotubes, or the like. In some embodiments, the second conductor 16 may be made of copper foil or a copper wire weave. The second conductor 16 may have multiple uses. The second conductor 16 may act as lightning protection, may act as a barrier to electromagnetic interference, may act as a return conductor, and may provide strength to the HVDC tether 10. The second conductor 16 may be spaced apart from the first conductor 12 be a distance 22 that may correspond to the thickness of the insulation layer 16. The distance 22 may be chosen, for example, to allow a power transmission of 15 kV along the HVDC tether 10. In some embodiments, the second conductor 16 may be equivalent to number 6 AWG copper wire and may have a thickness of about 0.01 inch thick.

The protective screen 20 may be made of an impermeable material, such as polyethylene. The protective screen 20 may be adapted to keep moisture out of the HVDC tether 10 and may protect the tether 10, especially, for example, when the tether 10 is wrapped on a mandrel. The protective screen 20 may be a 0.02 inch polyethylene covering.

Tables 1 and 2 below provide details on an exemplary embodiment of the present invention, wherein 6 AWG aluminum is used as the first conductor 12, 6 AWG equivalent copper is used as the second conductor 16, and Spectra 12® is used as the insulation layer 14.

TABLE 1

Circular Feeder Weight Summary

| | |
|---|---|
| Wire Weight (Al) | 24.10 lbs/1000 ft |
| Screen Weight | 1.12 lbs/1000 ft |
| Insulation Weight | 221.58 lbs/1000 ft |
| Wire Weight (Cu) | 79.49 lbs/1000 ft |
| TOTAL WEIGHT | 326.29 lbs/1000 ft |

Feeder diameter: 1.002 in

TABLE 2

Wire Diameter and Specific Layer Thickness

| Area | Diameter (in) | Thickness (in) |
|---|---|---|
| First conductor | 0.162 | 0.162 |
| Conductor screen | 0.201 | 0.020 |
| Insulation layer | 0.989 | 0.394 |
| Second conductor | 1.002 | 0.006 |

Figure 3:
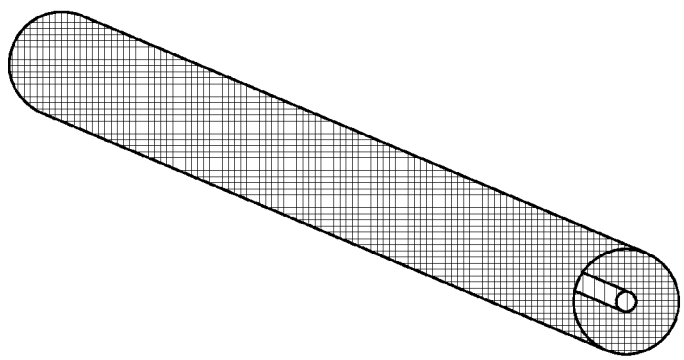
FIG. 3 is perspective view the HVDC tether of FIG. 1, showing thermal analysis results at a steady state.
Figure 3:
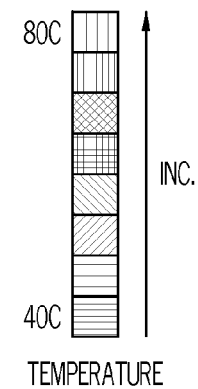
Figure 4:
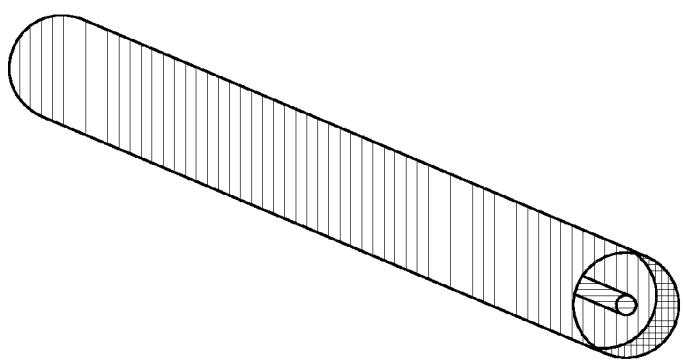
FIG. 4 is a perspective view of the HVDC tether of FIG. 1, showing thermal analysis results after a lightning strike.
Figure 4:
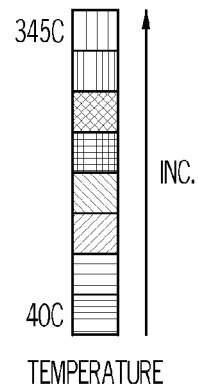

Lightning analysis of the HVDC tether 10 was conducted as shown in FIGS. 3 and 4. The thermal model was conducted on a 1 foot section of the HVDC tether 10 having the features described in Table 3 below.

TABLE 3

Thermal model HVDC tether description

| Component | Description |
|---|---|
| Outer Conductor | Thickness = 0.00659 in Resistance = 0.4028 Ω/1000 ft |
| Insulation | Conductivity = 0.2 W/mK |
| Inner Conductor | Diameter = 0.162 in Resistance = 0.648 Ω/1000 ft |

In a steady state model (FIG. 3), the feeder temperature under steady state was determined with a steady state voltage of 15 kVDC, power of 1 MW, Current of 66.7 amperes DC and an ambient temperature of 50° C.

TABLE 4

Thermal Model Results

| Conductor | Pdiss (W/ft) | Temp (° C.) | Delta Rise (° C.) |
|---|---|---|---|
| Inner Al | 2.88 | 79 | 29 |
| Outer Cu | 1.79 | 62 | 12 |

In the above Table 4, Pdiss (W/ft) refers to power dissipated per foot of wire at the steady state condition, Temp is the final wire temperature, and delta rise shows the change in temperature from ambient conditions.

A transient model was used to simulate the effect of a 200 kA lightning strike. The peak power for this lightning strike is 16.112 MW/ft. The analysis assumes the following conditions before the lightning strike:

Ambient temperature=50° C.

Feeder cables conducting 66.7 ADC.

Referring to FIG. 4, the transient thermal model results showed that the peak temperature of the outer conductor reached 144° C. at the end of the transient simulation. Adding delta temperature rise from the steady state simulation gives the following:

Inner Al conductor=79° C. (delta T rise=29° C.)

Outer Cu conductor=156° C. (delta T rise=106° C.).

The examples below describe build options for the HVDC tether 10. These examples describe specific embodiments from which variations may be included in the scope of the present invention as defined by the claims.

Coaxial Cable Option 1

Aluminum core conductor (~0.156 inch OD);

Extruded insulating conductor screen (0.020 inch for Sample 1 and 0.040 inch for Sample 2);

High strength fiber rope between core and cover conductors acts as partial complete insulation (~0.156 inch OD);

oil copper cover (~0.006 inch thick) used as a power return and for lightning protection. This could be a continuous foil or a foil spiral wrapped around the cable; and Extruded protective screen (0.020 inch).

Coaxial Cable Option 2

Aluminum core conductor (0.156 inch OD);

Extruded insulating conductor screen (0.020 inch for Sample 1 and 0.040 inch for Sample 2);

High strength fiber rope between core and cover conductors acts as partial complete insulation (~0.156 inch OD);

Copper shield used a power return and lightning protection with the following characteristics:

Copper carrier diameter 0.010 inch

Number of carriers=225

Weaving angle=10°

Shield weight=0.08 lb/ft; and

Extruded protective screen (0.020 inch).

The configuration proposed by the HVDC tether 10 of the present invention helps to ensure mechanical strength under load; insulation/dielectric properties at high voltage; lightning strike survivability; insulation/dielectric properties at high voltage under mechanical tensile load; and reduced cost and weight as compared to conventional tethers.

It should be understood, of course, that the foregoing relates to exemplary embodiments of the invention and that modifications may be made without departing from the spirit and scope of the invention as set forth in the following claims.

We claim:

1. A cable comprising:

a first conductor;

a mechanical strength element surrounding the first conductor and constructed from a manufactured fiber spun from a liquid crystal; and a second conductor surrounding the mechanical strength element, the mechanical strength element constructed from a high strength fiber composite material to provide mechanical strength and insulation to the cable when the cable is connected to an electric load, the second conductor to provide simultaneous electrical conduction, electromagnetic shielding and lightning protection to the cable.

2. The cable of claim 1, wherein the first conductor and the second conductor are coaxially disposed relative to each other.

3. The cable of claim 1, further comprising a conductor screen disposed between the first conductor and the mechanical strength element.

4. The cable of claim 3, wherein the conductor screen is constructed from polyethylene.

5. The cable of claim 1, further comprising a protective screen covering the second conductor.

6. The cable of claim 5, wherein the protective screen is a moisture impermeable.

7. The cable of claim 1, wherein the first conductor is an aluminum wire.

8. The cable of claim 1, wherein the second conductor is a foil copper covering on the mechanical strength element to form a return conductor.

9. The cable of claim 1, wherein the second conductor is a copper shield constructed from a weave of a plurality of copper wires.

10. A high voltage direct current (HVDC) tether for tethering an airborne wind turbine to the Earth, comprising:

a first conductor;

a mechanical strength element coaxially disposed on the first conductor; and a second conductor coaxially disposed on the mechanical strength element, the mechanical strength element constructed from a high strength fiber composite material to provide mechanical strength and insulation to the cable when the HVDC tether is connected to an electric load, the second conductor simultaneously provides electrical conduction, electromagnetic shielding and lightning protection to the cable, wherein the second conductor is a return conductor for the HVDC tether.

11. The HVDC tether of claim 10, further comprising a conductor screen coaxially disposed between the first conductor and the mechanical strength element which has a steady state tensile strength of at least about 50,000 Lbs.

12. The HVDC tether of claim 10, further comprising a protective screen which is moisture impermeable and covers the second conductor.

13. A cable for supporting and electrically connecting an airborne wind turbine to Earth, comprising:

a first conductor;

a mechanical strength element coaxially disposed around the first conductor;

a conductor screen coaxially disposed between the first conductor and the mechanical strength element;

a second conductor coaxially disposed on the mechanical strength element; and a protective screen which is moisture impermeable and covers the second conductor without providing substantial load sharing for the cable when the cable supports and is electrically connected to the air wind turbine, the mechanical strength element constructed from a high strength fiber composite material to provide mechanical strength and insulation to the cables the second conductor to simultaneously provide electrical conduction, electromagnetic shielding and lightning protection for the cable when the cable supports and is electrically connected to the air wind turbine.

14. The cable of claim 13, wherein the mechanical strength element is constructed from a manufactured fiber spun from a liquid crystal polymer.

15. The cable of claim 13, wherein the mechanical strength element is constructed from an ultra-high molecular weight polyethylene, and has a steady state tensile strength of at least about 50,000 Lbs.

16. The cable of claim 15, wherein the second conductor is a return conductor for the airborne wind turbine.

* * * * *